United States Patent
Kuroda

(10) Patent No.: US 11,073,839 B2
(45) Date of Patent: Jul. 27, 2021

(54) TRAVELING APPARATUS, TRAVEL CONTROL METHOD OF TRAVELING APPARATUS, AND RECORDING MEDIUM

(71) Applicant: SHARP KABUSHIKI KAISHA, Sakai (JP)

(72) Inventor: Tatsuro Kuroda, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 199 days.

(21) Appl. No.: 16/438,124

(22) Filed: Jun. 11, 2019

(65) Prior Publication Data

US 2019/0384323 A1 Dec. 19, 2019

(30) Foreign Application Priority Data

Jun. 14, 2018 (JP) .............................. JP2018-113574

(51) Int. Cl.
*G05D 1/02* (2020.01)
*B60W 30/095* (2012.01)
*G01S 17/931* (2020.01)

(52) U.S. Cl.
CPC ....... *G05D 1/0289* (2013.01); *B60W 30/0956* (2013.01); *G05D 1/0274* (2013.01); *G01S 17/931* (2020.01); *G05D 2201/0213* (2013.01)

(58) Field of Classification Search
CPC .......... G05D 1/0274–0289; G05D 2201/0213; B60W 30/0956; G01S 17/931
See application file for complete search history.

(56) References Cited

U.S. PATENT DOCUMENTS

| 5,754,099 A * | 5/1998 | Nishimura ............. G05D 1/024 340/435 |
| 8,457,892 B2 * | 6/2013 | Aso ...................... G05D 1/0214 701/519 |
| 2007/0069873 A1 * | 3/2007 | Kudo ................... B62D 15/029 340/435 |
| 2015/0336546 A1 * | 11/2015 | Al-Zahrani ........... B60W 30/09 701/93 |
| 2015/0348417 A1 * | 12/2015 | Ignaczak ................ G08G 1/166 340/435 |
| 2017/0039865 A1 * | 2/2017 | Takabayashi .......... G08G 1/167 |
| 2017/0217422 A1 | 8/2017 | Nakamura |

(Continued)

FOREIGN PATENT DOCUMENTS

| CN | 106660552 A | 5/2017 |
| JP | 2014-019262 A | 2/2014 |

*Primary Examiner* — Calvin Cheung
(74) *Attorney, Agent, or Firm* — ScienBiziP, P.C.

(57) ABSTRACT

A traveling apparatus includes a housing, an obstacle detection unit that detects a position of an obstacle in an area surrounding the housing, a traveling route determination unit that determines a traveling route of the housing in accordance with the position of the obstacle, and a travel driving unit that causes the housing to travel in accordance with the traveling route. The traveling route determination unit sets in accordance with the position of the obstacle in the area surrounding the housing a distribution of weights for taking a course to a width direction of a path of the housing and if the obstacle detection unit detects the obstacle on the path of the housing, the traveling route determination unit sets the distribution of the weights such that a weight of an evasive course in a predetermined direction to the obstacle increases.

11 Claims, 15 Drawing Sheets

(56) References Cited

U.S. PATENT DOCUMENTS

| | | | |
|---|---|---|---|
| 2017/0274898 A1* | 9/2017 | Nakamura | B60W 30/18163 |
| 2018/0024564 A1* | 1/2018 | Matsuda | B60W 30/18145 |
| | | | 701/25 |
| 2018/0101178 A1* | 4/2018 | Yoon | G05D 1/0253 |
| 2018/0252539 A1* | 9/2018 | Yunoki | G08G 1/167 |

* cited by examiner

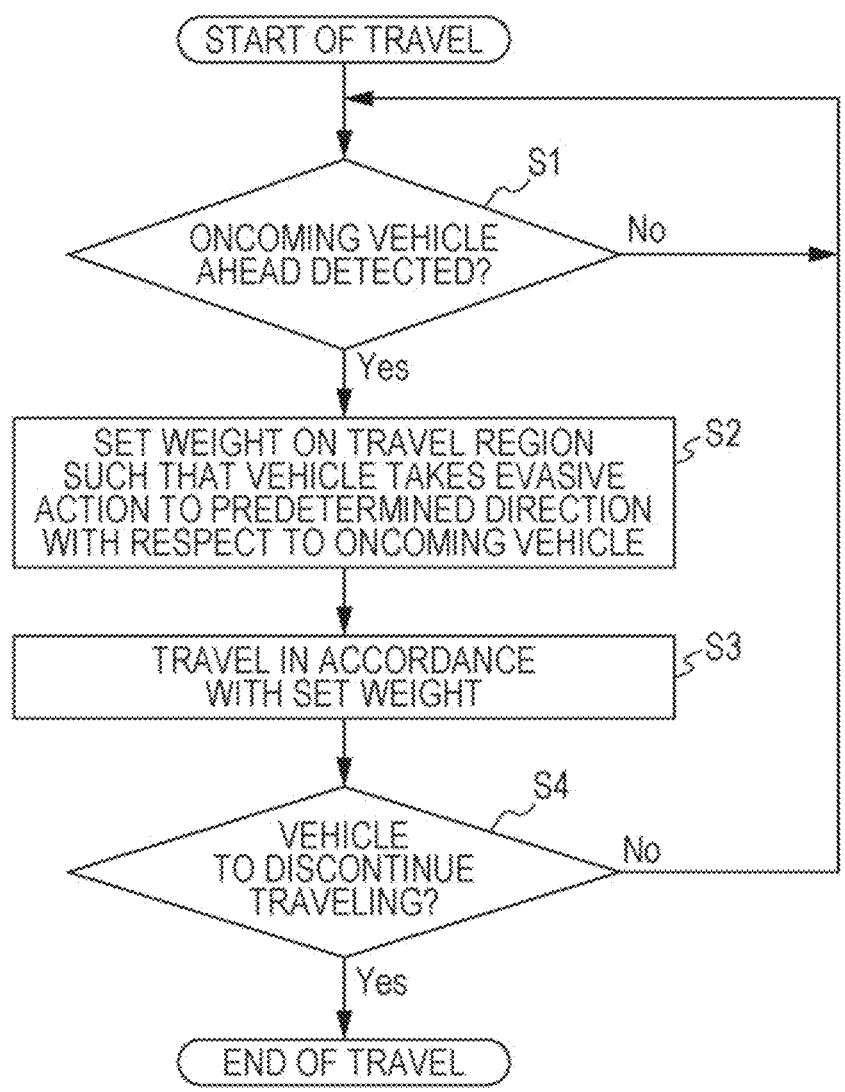

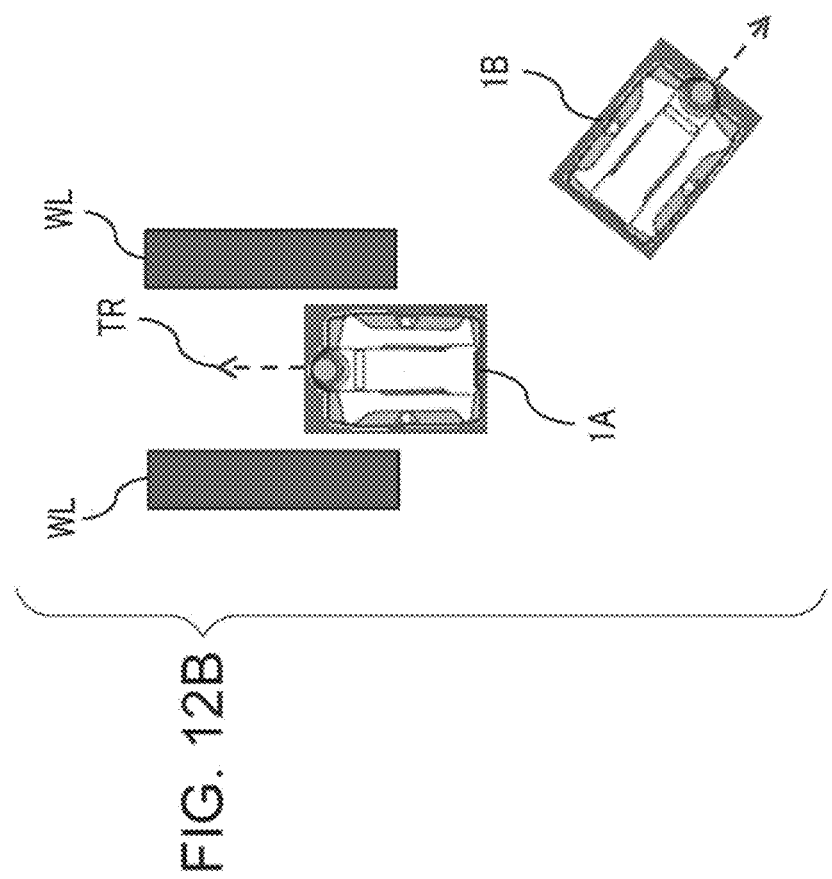
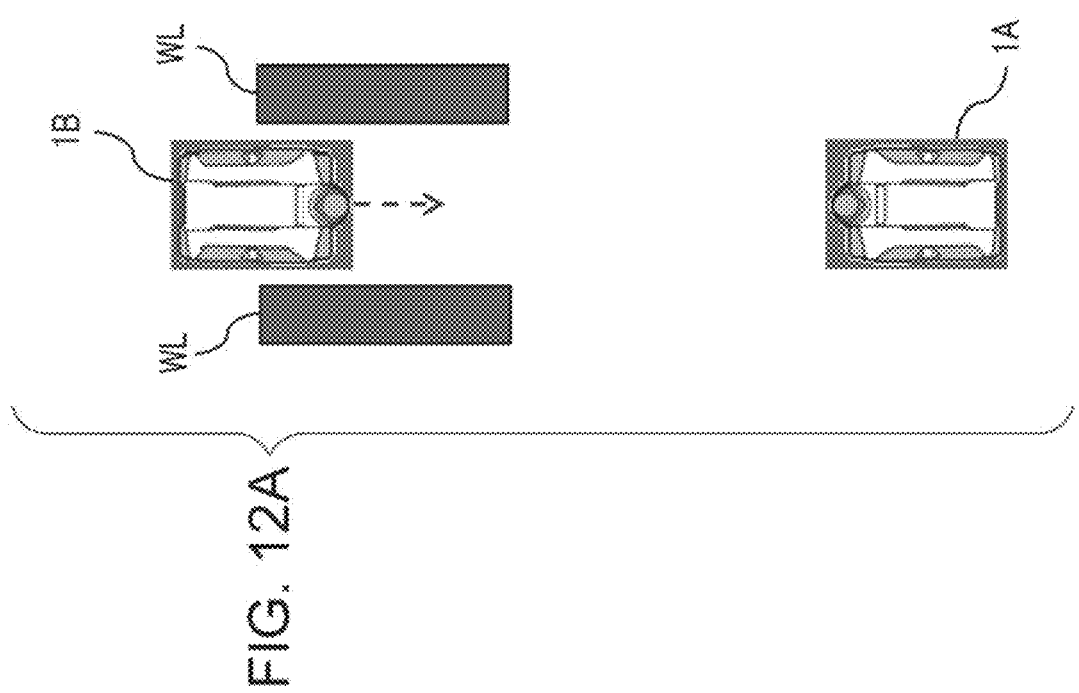

ADVANCE TIMING TO SHIFT PEAK OF HILL IN POSITION. WIDTH ACROSS HILL MAY BE DECREASED AND RESPONSE SPEED IN TURNING MAY BE INCREASED.

TRAVELING APPARATUS, TRAVEL CONTROL METHOD OF TRAVELING APPARATUS, AND RECORDING MEDIUM

BACKGROUND

1. Field

The present disclosure relates to a traveling apparatus, a travel control method of the traveling apparatus, and a recording medium on which a travel control program of the traveling apparatus is stored.

2. Description of the Related Art

A traveling apparatus typically has more difficulty in taking an evasive action with respect to a moving obstacle than to a standstill obstacle. In particular, when two autonomous traveling apparatuses travel in oncoming traffic on the same road, each apparatus determines their evasive courses independently, and each apparatus is unable to learn which way the other apparatus takes until immediately prior to a collision. If the two apparatuses take the same side, there is a possibility of collision.

A traveling apparatus performs control to stop once to avoid a collision in oncoming traffic if an oncoming traveling apparatus is detected on the same path. It is not efficient if the traveling apparatus is stopped each time an oncoming apparatus is detected.

In one traveling apparatus of the related art, a traveling control method is performed to avoid the same path via communications of the two traveling apparatuses. The process involved in this operation is complex.

In one disclosed travel control method of a traveling apparatus of the related art, a travel-enabled area and a travel-restricted area are setup on a map that indicates a travel region. The traveling apparatus runs along a set travel course.

Japanese Unexamined Patent Application Publication No. 2014-19262 discloses a vehicle assisting apparatus. The vehicle assisting apparatus includes a control gain setting unit and at least one of a feed-forward control unit and a feedback control unit. The feed-forward control unit computes as a feed-forward output value an output value that responds to a shape of left and right white curb-marking lines recognized by a forward environment recognition unit. The feedback control unit computes as a feedback output value an output value that responds to a travel condition of a vehicle and the shape of left and right curb-marking white lines recognized by the forward environment recognition unit. In response to an obstacle recognized by the forward environment recognition unit, the control gain setting unit variably sets a weight of a term in the computation of the feed-forward output value and a weight of a term in the computation of the feedback output value.

When two traveling apparatuses performing such a travel control method run on the same course in oncoming traffic, each apparatus determines their courses independently and is unable to learn which way the other apparatus takes until immediately prior to a collision. If the two apparatuses take an evasive action to the same side, there is still a possibility of collision.

It is desirable to provide a traveling apparatus that more efficiently avoids a collision with an oncoming traveling apparatus than in the related art. It is also desirable to provide a travel control method of the traveling apparatus and a non-transitory computer-readable recording medium storing a program for the travel control method.

SUMMARY

According to an aspect of the disclosure, there is provided a traveling apparatus. The traveling apparatus includes a housing, an obstacle detection unit that detects a position of an obstacle in an area surrounding the housing, a traveling route determination unit that determines a traveling route of the housing in accordance with the position of the obstacle, and a travel driving unit that causes the housing to travel in accordance with the traveling route. The traveling route determination unit sets in accordance with the position of the obstacle in the area surrounding the housing a distribution of weights for taking a course to a width direction of a path of the housing and if the obstacle detection unit detects the obstacle on the path of the housing, the traveling route determination unit sets the distribution of the weights such that a weight of an evasive course in a predetermined direction with respect to the obstacle increases.

According to another aspect of the disclosure, there is provided a travel control method of a traveling apparatus. The travel control method includes detecting a position of an obstacle in an area surrounding the traveling apparatus, determining a traveling route of the traveling apparatus in accordance with the position of the obstacle, and causing the traveling apparatus to travel in accordance with the traveling route. In the determining, in accordance with the position of the obstacle in the area surrounding the traveling apparatus, a distribution of weights for taking a course to a width direction of a path of the traveling apparatus is set and if the obstacle on the path of the traveling apparatus is detected in the detecting, the distribution of the weights is set such that a weight of an evasive course in a predetermined direction with respect to the obstacle increases.

According to another aspect of the disclosure, there is provided a non-transitory computer readable medium storing a program causing a processor of a traveling apparatus to execute a process. The process includes detecting a position of an obstacle in an area surrounding a traveling apparatus, determining a traveling route of the traveling apparatus in accordance with the position of the obstacle, and causing the traveling apparatus to travel in accordance with the traveling route. In the determining, in accordance with the position of the obstacle in the area surrounding the traveling apparatus, a distribution of weights for taking a course to a width direction of a path of the traveling apparatus is set and if the obstacle on the path of the traveling apparatus is detected in the detecting, the distribution of the weights is set such that a weight of an evasive course in a predetermined direction with respect to the obstacle increases.

BRIEF DESCRIPTION OF THE DRAWINGS

FIG. 6 is a flowchart illustrating the travel control method of the autonomous traveling vehicle of Embodiment 1 of the disclosure;

FIGS. 12A and 12B illustrate a specific example of traveling of the autonomous traveling vehicle of Embodiment 2 of the disclosure;

DESCRIPTION OF THE EMBODIMENTS

Figure 1:
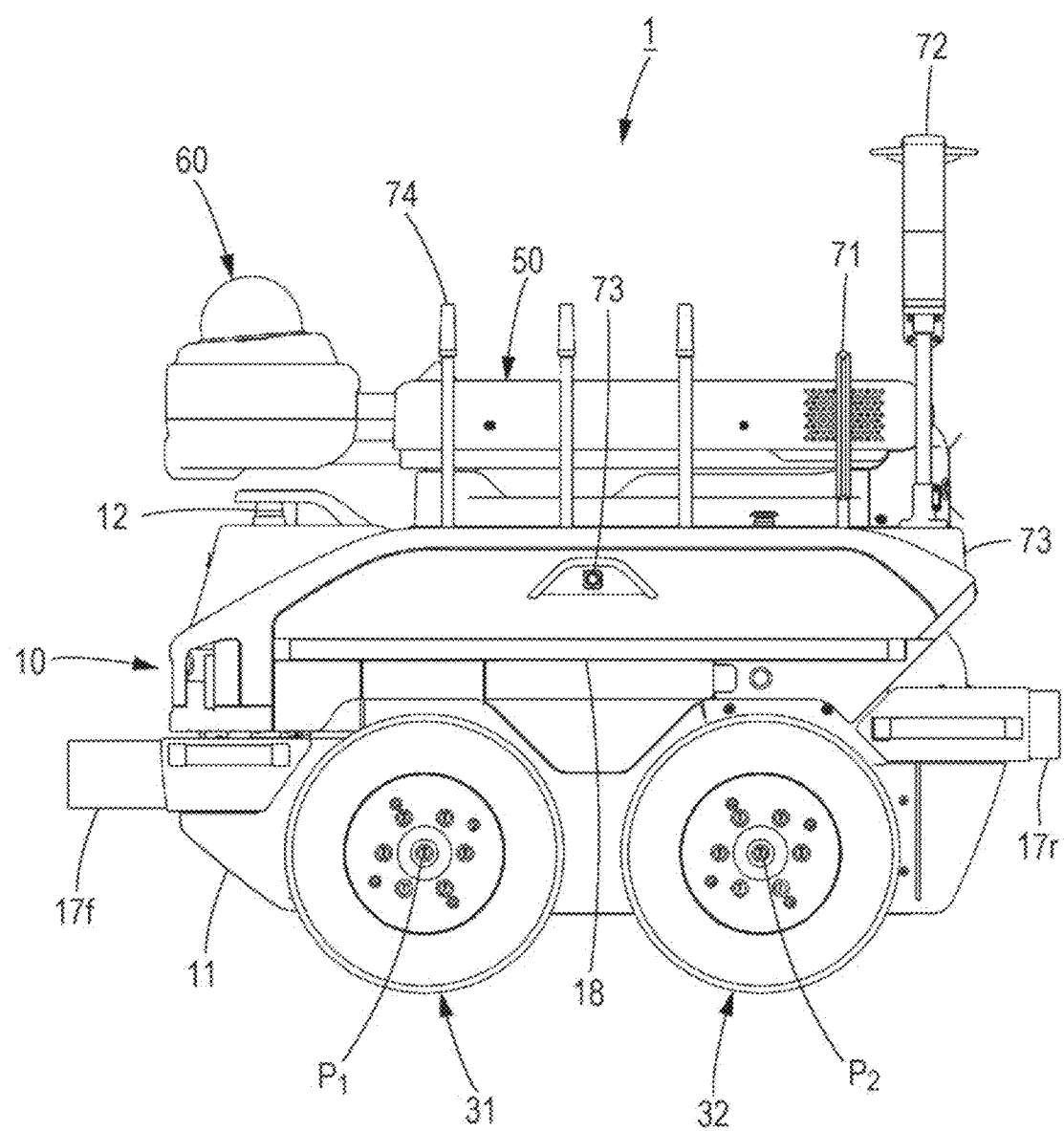
FIG. 1 is a left-side view of an autonomous traveling vehicle of Embodiment 1 of the disclosure.

Referring to the drawings, embodiments of an autonomous traveling vehicle 1 as an example of a traveling apparatus of the disclosure are described below. The following description is not intended to limit the scope of the disclosure. The disclosure is not limited to the autonomous traveling vehicle and is also applicable to a vehicle that has an automatic obstacle evading function and is driven by humans.

Embodiment 1

Figure 2:
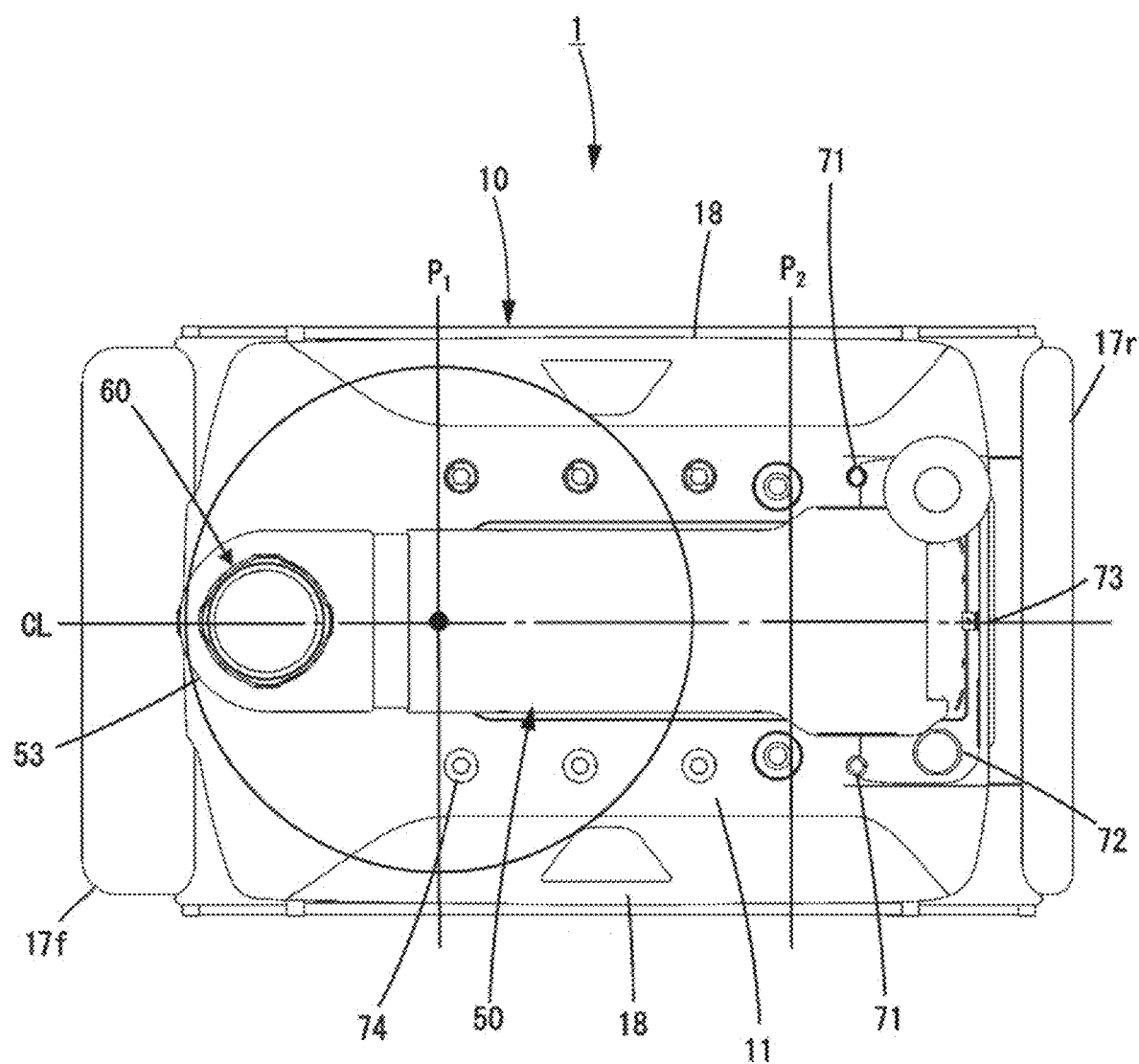
FIG. 2 is a plan view of the autonomous traveling vehicle of FIG. 1.
Figure 3A:
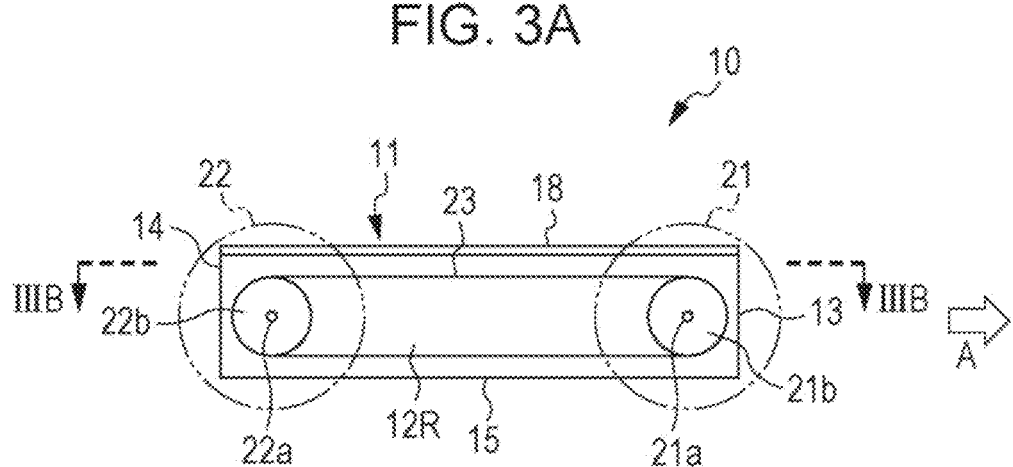
FIG. 3A is a right-side view of a whole configuration of an electrically-powered vehicle base of the autonomous traveling vehicle of FIG. 1
Figure 3B:
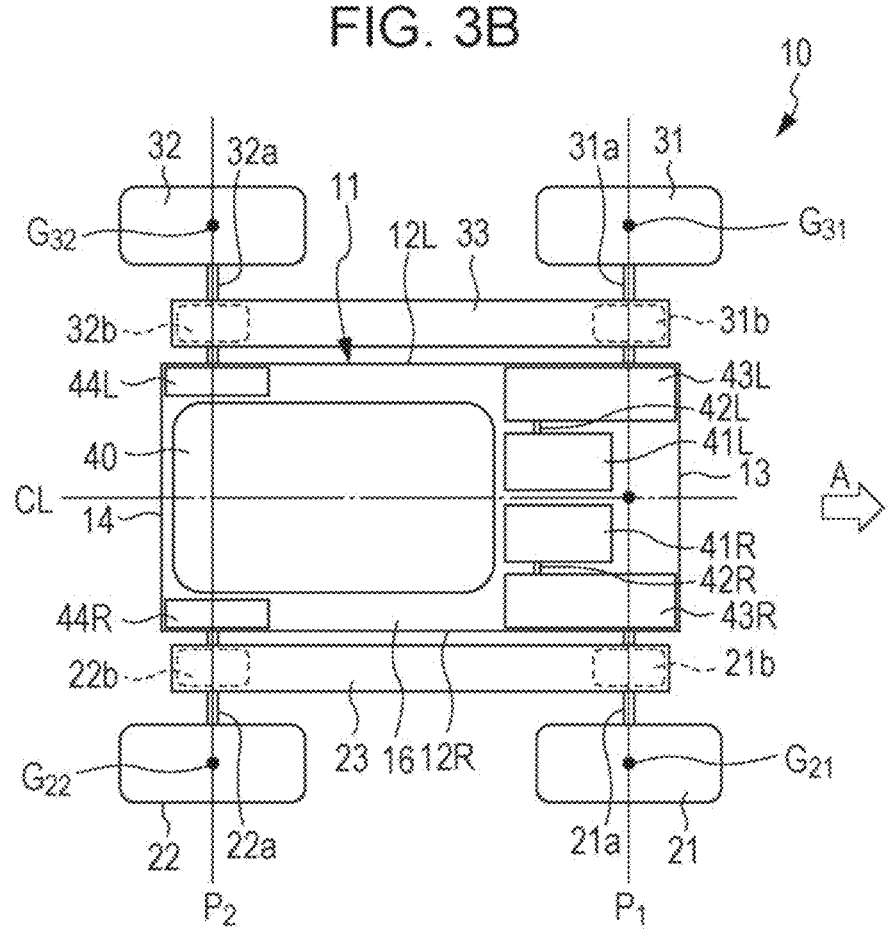
FIG. 3B is a sectional view taken along line IIIB-IIIB in FIG. 3A.

FIG. 1 is a left-side view of an autonomous traveling vehicle 1 of Embodiment 1 of the disclosure. FIG. 2 is a plan view of the autonomous traveling vehicle 1 of FIG. 1. FIG. 3A is a right-side view of a whole configuration of an electrically-powered vehicle base 10 of the autonomous traveling vehicle 1 of Embodiment 1 and FIG. 3B is a sectional view taken along line IIIB-IIIB in FIG. 3A.

The autonomous traveling vehicle 1 of the first exemplary embodiment of the disclosure mainly includes the electrically-powered vehicle base 10, a lifting mechanism 50 mounted on the electrically-powered vehicle base 10, and a monitoring camera 60 mounted on the forward end of the lifting mechanism 50.

The autonomous traveling vehicle 1 is described in more detail. A distance measuring unit 12 is mounted on the forward end of the electrically-powered vehicle base 10, and a Wi-Fi antenna 71 and a warning light 72 are mounted on a rear end of the electrically-powered vehicle base 10. Charge-coupled device (CCD) cameras 73 are mounted on the left side, right side and rear-end side of the electrically-powered vehicle base 10. A global positioning system (GPS) antenna 74 is mounted behind the monitoring camera 60 of the lifting mechanism 50 on the electrically-powered vehicle base 10.

The distance measuring unit 12 has a function of checking the condition of the forward region ahead of the autonomous traveling vehicle 1 and the road surface traveled by the autonomous traveling vehicle 1. The distance measuring unit 12 includes a light emitter that emits light, a light receiver that receives light, and a scan controller that causes projection light to scan the light projection direction such that the light is projected onto multiple predetermined measurement points SP in the forward region ahead of the autonomous traveling vehicle 1. The distance measuring unit 12 may be light detection and ranging or laser imaging detection and ranging (LIDAR) that emits laser in a two-dimensional (2D) or three-dimensional (3D) space in a predetermined distance measurement region. The distance measuring unit 12 measures distances to the measurement points SP in the distance measurement region.

A control unit 100 performs a traveling function or a monitoring function of the autonomous traveling vehicle 1. For example, the control unit 100 includes a controller (a travel controller and a safety controller), an obstacle detection unit, a human detector, an instruction recognition unit, a communication unit, an instruction executing unit, and a memory.

The control unit 100 performs travel control of the autonomous traveling vehicle 1 in accordance with a travel control program for travel controlling of the autonomous traveling vehicle 1 stored on the memory. The control unit 100 may perform the travel control by reading the travel control program stored on a computer-readable recording medium and executing the read travel control program.

The control unit 100 may control the traveling of the autonomous traveling vehicle 1 in response to a travel control instruction received via the communication unit from an external travel control apparatus, such as a server. In such a case, the external travel control apparatus reads the travel control program for the autonomous traveling vehicle 1 stored on a memory in the server or on the computer-readable recording medium and executes the read travel control program.

The autonomous traveling vehicle 1 stores, in advance, travel route information and map information of a region that is to be traveled. The autonomous traveling vehicle 1 is configured to travel along a predetermined route while avoiding an obstacle by using information acquired from the monitoring camera 60, the distance measuring unit 12 and GPS. In accordance with Embodiment 1, the distance measuring unit 12 emits laser to a 2D space and measures the distance to a measurement point SP. The distance measuring unit 12 may emit laser to a 3D space for measurement.

Using the monitoring camera 60, the distance measuring unit 12, and the like, the autonomous traveling vehicle 1 autonomously travels while checking the state of a travel region in a forward direction of the electrically-powered vehicle base 10. If the autonomous traveling vehicle 1 has detected an obstacle or a bump, the autonomous traveling vehicle 1 changes the path thereof by stopping, turning, driving in reverse, and/or driving forward in order to avoid the obstacle or the bump.

The configuration of the autonomous traveling vehicle 1 related to the traveling operation thereof is described with reference to FIGS. 3A and 3B. As illustrated in FIG. 3A, a front right wheel 21 and a rear right wheel 22 are illustrated by two-dot chain lines. As illustrated in FIG. 3B, sprockets 21b, 22b, 31b, and 32b to be described later are illustrated by broken lines.

Electrically-Powered Vehicle Base

The electrically-powered vehicle base 10 includes a vehicle base body 11, four wheels, namely, a pair of front right and rear right wheels and a pair of front left and rear left wheels rotatably mounted on the vehicle base body 11, two electric motors 41R and 41L that drive at least one in fore and aft of the pair of front right and rear right wheels and the pair of front left and rear left wheels, a battery 40 that supplies power to the electric motors 41R and 41L, the distance measuring unit 12, and the control unit 100.

In accordance with Embodiment 1 illustrated in FIGS. 3A and 3B, the electrically-powered vehicle base 10 runs forward as denoted by an arrow mark A. The front right and front left wheels on the side of the arrow mark A are front wheels 21 and 31, and the remaining wheels are rear wheels 22 and 32. The front right and front left wheels 21 and 31 are separately and respectively driven by the electric motors 41R and 41L.

Referring to FIG. 3B, the front wheels 21 and 31 and the rear wheels 22 and 32 have respectively centers of around contact $G_{21}$, $G_{31}$, $G_{22}$, and $G_{32}$. The battery 40 is housed in a container space 16 of the vehicle base body 11.

FIGS. 3A and 3B simply illustrate the elements and the configuration of the electrically-powered vehicle base 10. The sizes of the elements and spacings between the elements in the electrically-powered vehicle base 10 illustrated in FIGS. 3A and 3B are not necessarily consistent with those of the electrically-powered vehicle base 10 illustrated in FIGS. 1 and 2.

In the vehicle base body 11, bumpers 17f and 17r are respectively mounted on a front-end side 13 and a rear-end side 14. A cover band 18 is mounted on each of a right-side face 12R and a left-side face 12L and extending along the front-rear direction of the vehicle base body 11. Axle shafts 21a and 31a and axle shafts 22a and 32a rotatably and respectively supporting the front wheels 21 and 31 and the rear wheels 22 and 32 are mounted on the lower sides of the cover bands 18. The axle shafts 21a and 31a of the front wheels 21 and 31 are aligned with each other on a same first axis $P_1$ and the axle shafts 22a and 32a of the rear wheels 22 and 32 are aligned with each other on a same second axis $P_2$. The axle shafts 21a, 31a, 22a, and 32a are independently rotatable if they are not mechanically coupled via a power transmission member.

Belts 23 and 33 mechanically couple the pair of front right and rear right wheels 21 and 22 with the pair of front left and rear left wheels 31 and 32, respectively. Specifically, the sprocket 21b is attached to the axle shaft 21a of the front right wheel 21, and the sprocket 22b is attached to the axle shaft 22a of the rear right wheel 22. The belt 23 having on the inside thereof teeth in mesh with the sprockets 21b and 22b is entrained about the sprocket 21b of the front right wheel 21 and the sprocket 22b of the rear right wheel 22. Similarly, the sprocket 31b is attached to the axle shaft 31a of the front left wheel 31, and the sprocket 32b is attached to the axle shaft 32a of the rear right wheel 32. The belt 33 having a structure identical to the structure of the belt 23 is entrained about the sprocket 31b of the front left wheel 31 and the sprocket 32b of the rear left wheel 32.

Since the front right and rear right wheels and front left and rear left wheels (21 and 22, and 31 and 32) are mechanically coupled by the belts (23 and 33), one wheel of each pair may be simply driven. In accordance with Embodiment 1, the front wheels 21 and 31 are driven. If the wheels 21 and 31 are set to be driving wheels, the other wheels 22 and 32 are driven without any slip by the belts 23 and 33 that serve as a power transmission member.

The power transmission member that couples and drives the front wheel and rear wheel may include the sprockets 21b and 31b and the belts 23 and 33 having on the inside thereof teeth in mesh with the sprockets 21b and 31b. Alternatively, the power transmission member may include the sprockets 21b and 31b and chains that are in mesh with the sprockets 21b and 31b. If some degree of slipping is acceptable, pulleys having a relatively high friction and the belts 23 and 33 may be used as the power transmission member. In this case, the power transmission member is designed such that the driving wheels are identical in rotational speed to the driven wheels.

Referring to FIGS. 3A and 3B, the front wheels (21 and 31) correspond to the driving wheels and the rear wheels (22 and 32) correspond to the driven wheels.

The two motors, namely, the electric motor 41R used to drive the front right and rear right wheels 21 and 22 and the electric motor 41L used to drive the front left and rear left wheels 31 and 32 are mounted on a bottom surface 15 of the vehicle base body 11 on the front wheel side. A gear box 43R as a power transmission mechanism is arranged between a motor shaft 42R of the right electric motor 41R and the axle shaft 21a of the front right wheel 21. A gear box 43L as a power transmission mechanism is arranged between a motor shaft 42L of the left electric motor 41L and the axle shaft 31a of the front left wheel 31. The two electric motors 41R and 41L are symmetrically arranged with respect to a center line CL in the direction of travel of the vehicle base body 11 (the direction denoted by the arrow mark A). The gear boxes 43R and 43L are respectively arranged outside the electric motors 41R and 41L.

The gear boxes 43R and 43L including multiple gears and shafts vary power from the electric motors 41R and 41L in terms of torque, rotational speed, and direction of rotation and transmit varied power to axle shafts 21a and 31a as output shafts. Each of the gear boxes 43R and 43L may include a clutch that connects or disconnects power transmission components. The pair of rear wheels 22 and 32 is rotatably supported by bearings 44R and 44L, respectively. The bearings 44R and 44L are respectively mounted close to the right-side surface 12R and the left-side surface 12L of the bottom surface 15 of the vehicle base body 11.

In the above configuration, the pair of front and rear wheels 21 and 22 on the right side and the pair of front and rear wheels 31 and 32 on the left side in the direction of travel may be driven independently of each other. Specifically, power of the right electric motor 41R is transmitted to the gear box 43R via the motor shaft 42R. The gear box 43R varies the input power in terms of the rotational speed, torque or the direction of rotation, and transmits the varied power to the axle shaft 21*a*. As the axle shaft 21*a* rotates, the front right wheel 21 rotates. The rotation of the axle shaft 21*a* is transmitted to the rear axle shaft 22*a* via the sprocket 21*b*, the belt 23, and the sprocket 22*b*. The rear right wheel 22 is thus rotated. Power from the left electric motor 41L to the front left wheel 31 and to the rear left wheel 32 is transmitted in a way similar to the way the power is transmitted on the right side as described above.

Travel Control Process of Embodiment 1

Figure 4:
FIG. 4 illustrates an example of a travel control method performed when autonomous traveling vehicles of the related art are opposed to each other on the same road.
Figure 5:
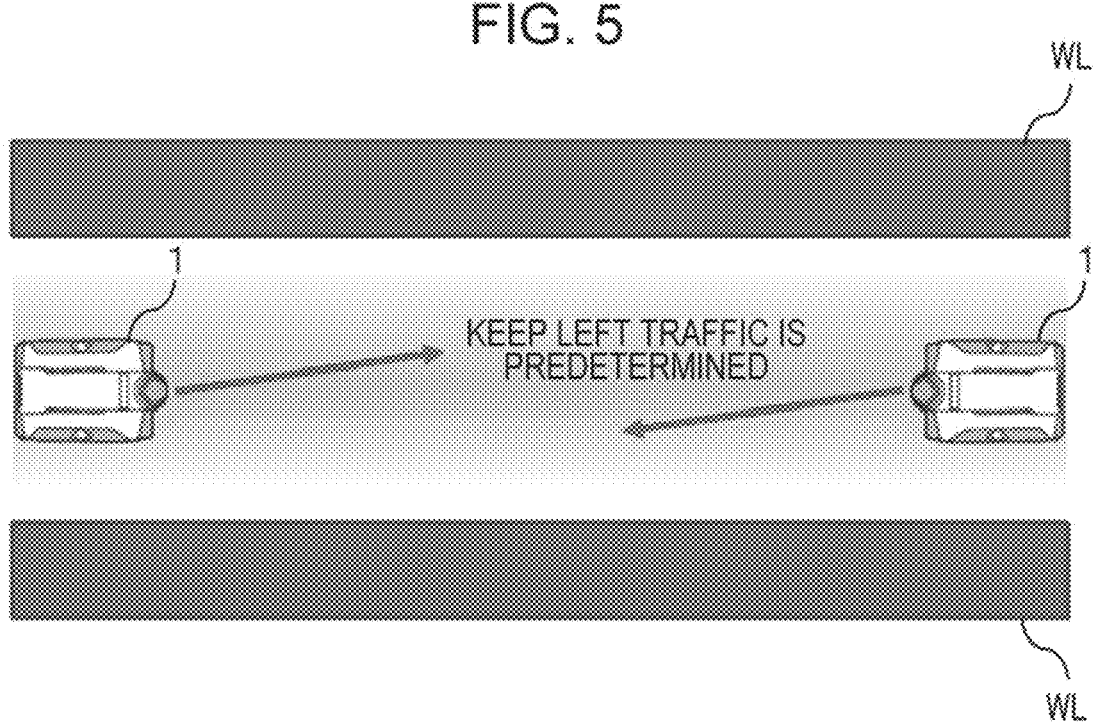
FIG. 5 illustrates an example of a travel control method performed when autonomous traveling vehicles of Embodiment 1 of the disclosure are opposed to each other on the same road.

A travel control process of Embodiment 1 of the disclosure is described with reference to FIGS. 4 through 8B. FIG. 4 illustrates an example of the travel control method performed when autonomous traveling vehicles 2 of the related art are opposed to each other on the same road. FIG. 5 illustrates an example of a travel control method performed when autonomous traveling vehicles 1 of Embodiment 1 of the disclosure are opposed to each other on the same road. FIG. 6 is a flowchart illustrating the travel control method of the autonomous traveling vehicle 1 of Embodiment 1 of the disclosure. FIGS. 7A to 8B illustrate an example of a method of determining a traveling route TR of the autonomous traveling vehicle 1 of Embodiment 1 of the disclosure.

Travel Control Method of Autonomous Traveling Vehicle of the Related Art

The two autonomous traveling vehicles 2 having an autonomous travel control function of the related art may now be traveling in mutually opposite directions on the road between walls WL as illustrated in FIG. 4. Since each vehicle 2 independently determines its evasive course, it is unable to learn which way to take for an evasive course until immediately prior to a collision.

As denoted by arrow marks, if the two vehicles take the same side for the evasive course as illustrated in FIG. 4, there is a risk of collision.

Travel Control Method of Autonomous Traveling Vehicle of Embodiment 1

The autonomous traveling vehicle 1 of Embodiment 1 is predetermined to take the evasive course to a predetermined side (to the left side in FIG. 5) when an oncoming vehicle is detected as illustrated in FIG. 5.

When a vehicle has detected an oncoming vehicle ahead, the two vehicles in oncoming traffic on the road may efficiently take an evasive course by predetermining which way to take.

After the autonomous traveling vehicle 1 starts moving in the travel control method, the obstacle detection unit determines in step S1 of FIG. 6 whether the obstacle detection unit has detected an oncoming vehicle ahead of the autonomous traveling vehicle 1 (step S1).

If the obstacle detection unit detects an oncoming vehicle ahead (yes branch from step S1), the control unit 100 sets a weight on a travel region TA such that the autonomous traveling vehicle 1 is prepared to take an evasive action to a predetermined direction with respect to the oncoming vehicle (step S2). The weight of the travel region TA is described with reference to FIGS. 7A to 8B.

In step S3, the control unit 100 causes the autonomous traveling vehicle 1 to travel in accordance with the weight set in step S2 (step S3).

In step S4, the control unit 100 determines whether to discontinue traveling of the autonomous traveling vehicle 1 (step S4). In response to a travel discontinuance instruction of the autonomous traveling vehicle 1 or depending on the remaining power of the battery 40, the control unit 100 determines that the autonomous traveling vehicle 1 is to discontinue traveling.

If the control unit 100 determines that the autonomous traveling vehicle 1 is to discontinue traveling (yes branch from step S4), the control unit 100 discontinues traveling. If the control unit 100 determines that the autonomous traveling vehicle 1 is not to discontinue traveling (no branch from step S4), the control unit 100 repeats the determination operation in step S1 (step S1).

Figure 7A:
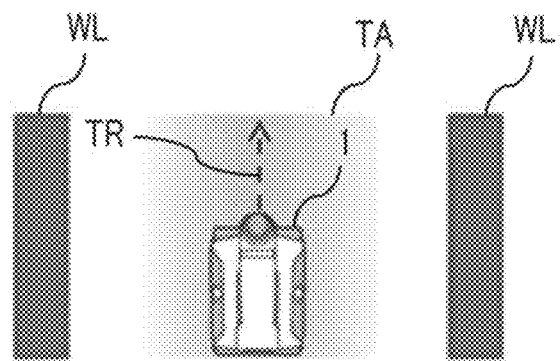
FIGS. 7A and 7B illustrate an example of a method of determining a traveling route of the autonomous traveling vehicle of Embodiment 1 of the disclosure.
Figure 7B:
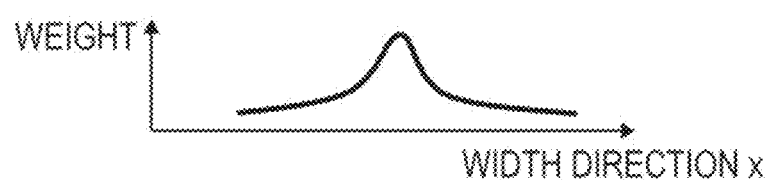

In a specific travel control method as illustrated in FIGS. 7A and 7B, based on the detection status of an obstacle present in an area surrounding the autonomous traveling vehicle 1, the control unit 100 sets the travel region TA in accordance with the priority of a route that the autonomous traveling vehicle 1 takes.

When the autonomous traveling vehicle 1 travels through the area between the walls WL as illustrated in FIG. 7A, the travel region TA is weighted as illustrated in FIG. 7B. In the graph of FIG. 7B, the abscissa represents a width direction x of the travel region TA and the ordinate represents the magnitude of weights. The same is true of FIG. 8B, FIG. 10B, FIG. 11B, FIGS. 13B and 13C, and FIGS. 14B and 14C.

The control unit 100 controls the traveling of the autonomous traveling vehicle 1 such that the autonomous traveling vehicle 1 takes a higher weight path with a higher priority. Referring to FIG. 7B, since the center portion of the width of the road has the highest weight, the autonomous traveling vehicle 1 travels along the center portion of the road with the highest priority.

The weighting is performed such that a lower weight is attached as the distance to the obstacle is shorter. Since the walls WL are present on both the right and left curbsides as illustrated the example of FIG. 7A, the weight is lower in the vicinity of the wall WL and higher in the center portion of the road apart from the wall WL.

The magnitude of the weight in FIG. 7B is represented by a density of the travel region TA in FIG. 7A. Referring to FIG. 7A, an area having a higher weight corresponds to a denser travel region TA and an area having a lower weight corresponds to a lighter travel region TA.

The control unit 100 determines the traveling route TR to take by placing a higher priority on the area having a higher weight, namely, the densely drawn area of the travel region TA and causes the autonomous traveling vehicle 1 to travel along the determined traveling route TR. Referring to FIG. 7A, the traveling route TR extends linearly forward along the center portion of the road.

Figure 8A:
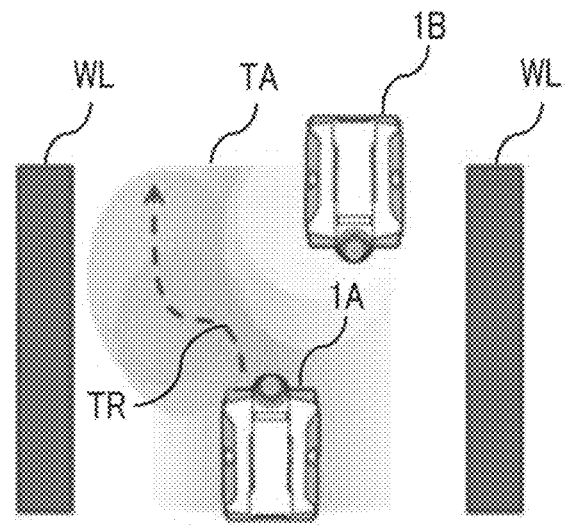
FIGS. 8A and 8B illustrate an example of a method of determining a traveling route of the autonomous traveling vehicle of Embodiment 1 of the disclosure.
Figure 8B:
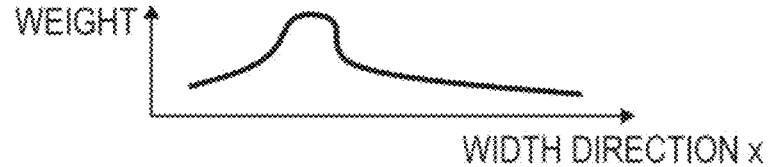

Referring to FIG. 8A, if a vehicle 1A and a vehicle 1B are opposing to each other on a road with the walls WL on both sides, the travel region TA is weighted as illustrated in FIG. 8B.

Referring to FIG. 8A, the walls WL are present on both sides of the vehicle 1A and the oncoming vehicle 1B is detected ahead. Not only the weight of an area closer to the wall WL is smaller but also the weight of an area closer to the vehicle 1B is smaller. As a result, the weight of an area closer to the left portion of the road along the width direction x of the road has a higher weight as illustrated in FIG. 8B.

The control unit 100 determines the traveling route TR to take by placing a higher priority on a higher weight area, namely, an area where the travel region TA is more densely drawn and then causes the vehicle to travel along the determined traveling route TR. Referring to FIG. 8A, the vehicle 1A travels along the traveling route TR that avoids the oncoming vehicle 1B by taking an evasive course to the left side.

When an oncoming vehicle is detected ahead, the control unit 100 weights the travel region TA such that the traveling route TR to a predetermined side (to the left side in Embodiment 1) has a higher weight.

Referring to FIGS. 7A and 7B and FIGS. 8A and 8B, the walls WL are present on both curbsides of the road. If the road includes on both sides areas unable to be driven, such as rising steep slopes, the travel region TA is weighted such that the corresponding area has a lower weight.

When a vehicle has detected an oncoming vehicle, the travel region TA is thus weighted such that the traveling route TR to a predetermined side has a higher weight. The vehicle thus travels by placing a higher priority on the higher weight route. The autonomous traveling vehicle 1 may thus more efficiently avoid a collision with the oncoming vehicle than vehicles of the related art.

Embodiment 2

Figure 9:
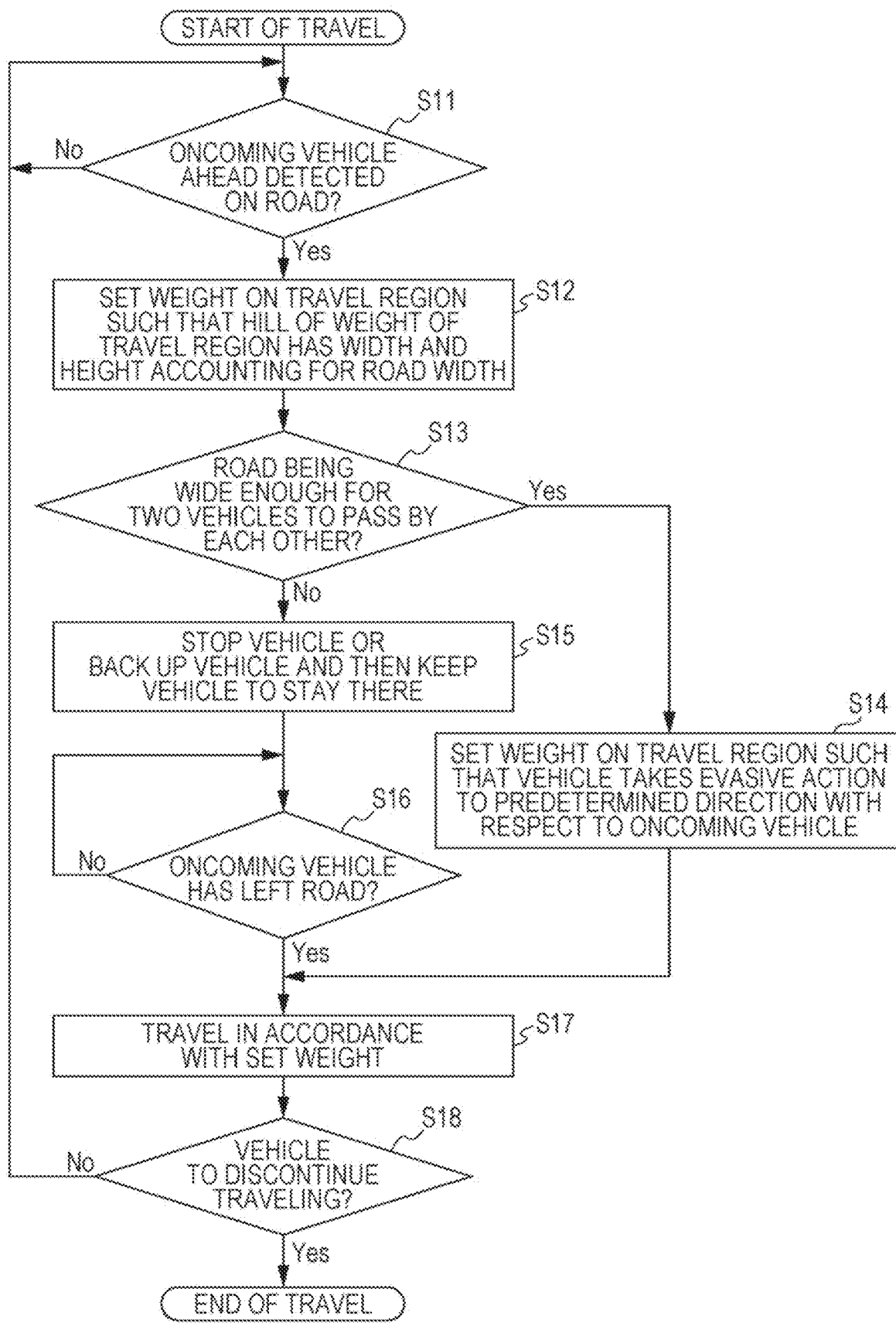
FIG. 9 is a flowchart illustrating a travel control method of an autonomous traveling vehicle of Embodiment 2 of the disclosure.

An example of a travel control method of Embodiment 2 of the disclosure is described with reference to FIG. 9 through FIGS. 12A and 12B. FIG. 9 is a flowchart illustrating the travel control method of the autonomous traveling vehicle 1 of Embodiment 2 of the disclosure. FIGS. 10A and 10B and FIGS. 11A and 11B illustrate examples of a determination method of the traveling route TR for the autonomous traveling vehicle 1 of Embodiment 2 of the disclosure. FIGS. 12A and 12B illustrate an example of traveling of the autonomous traveling vehicle 1 of Embodiment 2 of the disclosure.

In accordance with Embodiment 1 of the disclosure, if the obstacle detection unit in the autonomous traveling vehicle 1 has detected an oncoming vehicle ahead, the control unit 100 weights, without accounting for the width of the travel region TA, the travel region TA such that the weight of the traveling route TR to a predetermined side is higher.

The obstacle detection unit in the autonomous traveling vehicle 1 may now detect the oncoming vehicle 1B ahead in a narrow road that allows only one vehicle to pass through. The road is not wide enough to allow two vehicles to pass by each other. The control unit 100 may thus entirely avoid passing through the traveling route TR that extends in the road.

In accordance with Embodiment 2, if the oncoming vehicle 1B is detected ahead, the control unit 100 in the vehicle 1A performs travel control as illustrated in FIG. 9.

After the vehicle 1A starts traveling, the control unit 100 determines in step S11 in FIG. 9 whether the obstacle detection unit has detected the oncoming vehicle 1B ahead on the road (step S11).

If the obstacle detection unit has detected the vehicle 1B ahead on the road (yes branch from step S11), the control unit 100 sets a weight on the travel region TA in step S12 in accordance with detection results of the obstacle detection unit such that the hill of the weight of the travel region TA has a width and height accounting for the width of the road (step S12).

Figure 10A:
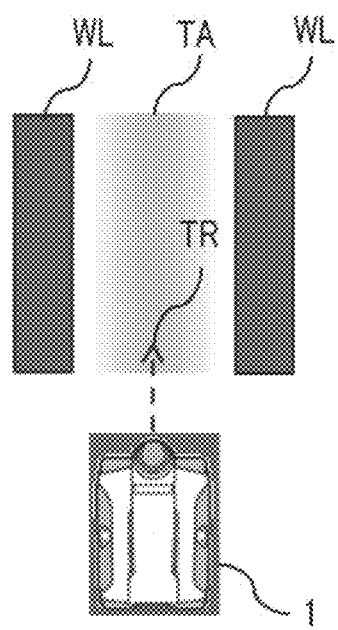
FIGS. 10A and 10B illustrate an example of a determination method of a traveling route for the autonomous traveling vehicle of Embodiment 2 of the disclosure.
Figure 10B:
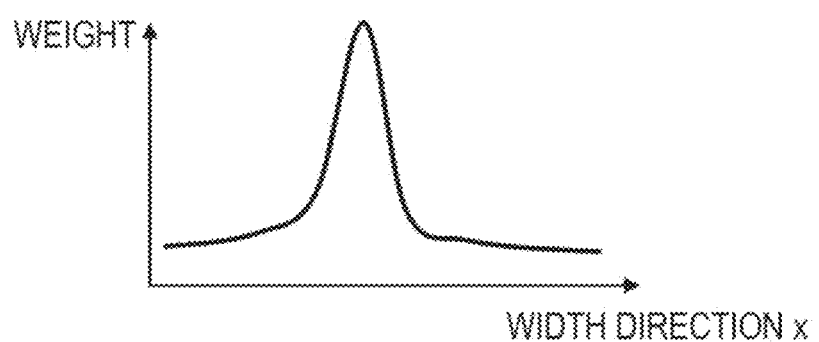

Specifically, as illustrated in FIGS. 10A and 10B, the control unit 100 sets the traveling route TR that has been weighted in accordance with the detection results of the walls WL of the road ahead of the vehicle 1A.

If the control unit 100 detects a narrow road that allows only one vehicle to pass therethrough as illustrated in FIG. 10A, the control unit 100 weights the travel region TA such that the width across the hill of the weight is narrower as illustrated in FIG. 10B in order to avoid a collision with the wall WL of the road.

The weight of the travel region TA is set such that the width across the hill of the weight is narrower. The vehicle 1A thus travels with a higher priority along the traveling route TR at the center portion of the road apart from the walls WL. The autonomous traveling vehicle 1 may safely travel along the narrow road.

Figure 11A:
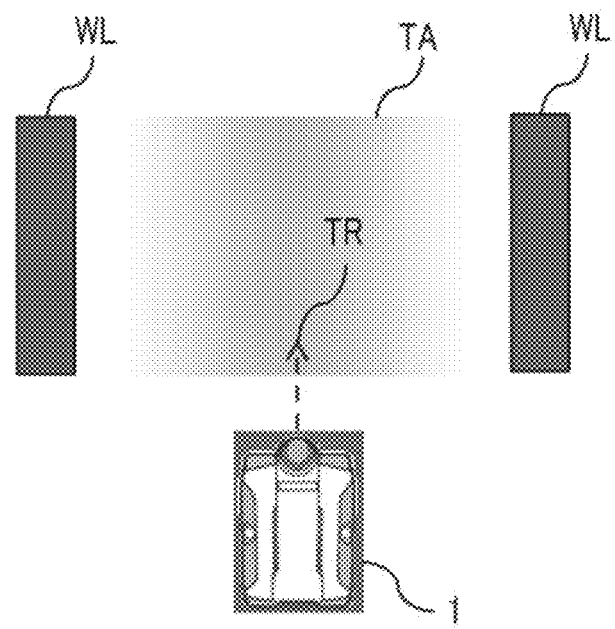
FIGS. 11A and 11B illustrate an example of a determination method of a traveling route for the autonomous traveling vehicle of Embodiment 2 of the disclosure.
Figure 11B:
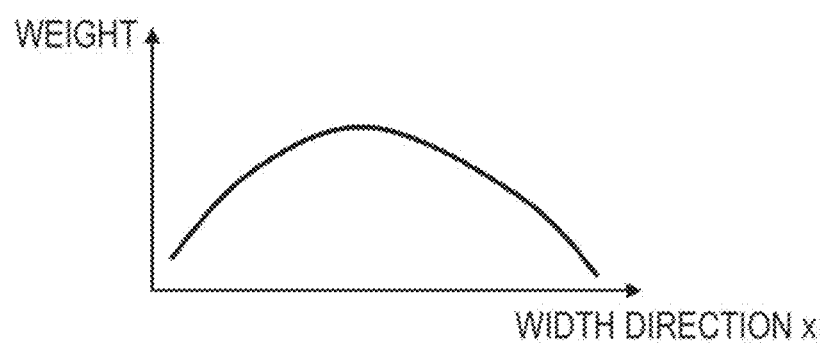

If the control unit 100 has detected a relatively wider road that allows two or more vehicles to pass by each other as illustrated in FIG. 11A, the travel region TA is weighted such that the width across the hill of the weight is relatively wider as illustrated in FIG. 11B.

The travel region TA is weighted such that the width across the hill of the weight increases. An evasive action is prepared to be taken while the vehicle travels to the utmost in the vicinity of the center of the road with a wider margin. The vehicle is more prepared for an unexpected happening.

In step S13, the control unit 100 determines whether the road is wide enough for two vehicles to pass by each other (step S13).

If the road is wide enough for two vehicles to pass by each other (yes branch from step S13), the control unit 100 sets a weight on the travel region TA such that the vehicle 1A is prepared to take an evasive course to a predetermined direction with respect to the oncoming vehicle (step S14). The control unit 100 performs an operation in step S17 (step S17).

If the road is not wide enough for two vehicles to pass by each other (no branch from step S13), the control unit 100 stops the vehicle 1A in front of the road and causes the vehicle 1A to temporarily stay there in step S15. If the vehicle 1A is already on the road, the control unit 100 backs up the vehicle 1A once outside the road and causes the vehicle 1A to stay there (step S15).

Referring to FIG. 12A, if the control unit 100 has detected the oncoming vehicle if on the road that allows only one vehicle to pass therethrough as illustrated in FIG. 12A, the vehicle 1A temporarily stops in front of the road. If the vehicle 1A is on the road, the control unit 100 backs up the vehicle 1A once such that the vehicle 1A is not in the way of the oncoming vehicle 1B and then the control unit 100 causes the vehicle 1A to stay there after leaving the road.

In step S16 in FIG. 9, the control unit 100 determines whether the oncoming vehicle 1B has left the road (step S16). If the oncoming vehicle 1B has left the road (yes branch from step S16), the control unit 100 performs the operation in step S17 (step S17). If the oncoming vehicle 1B is still on the road (no branch from step S16), the control unit 100 repeats the determination operation in step S16 (step S16).

In step S17, the control unit 100 causes the vehicle 1A to travel in accordance with the set weight (step S17).

When the oncoming vehicle 1B having left the road is detected as illustrated in FIG. 12B, the vehicle 1A travels along the road in accordance with the weight of the travel region TA set in accordance with the road width.

In step S18, the control unit 100 determines whether to discontinue the traveling of the vehicle 1A (step S18).

If the control unit 100 determines that the vehicle 1A is to discontinue traveling (yes branch from step S18), the control unit 100 causes the vehicle 12 to discontinue traveling. If the control unit 100 determines that the vehicle 1A is not to discontinue traveling (no branch from step S18), the control unit 100 repeats the determination operation in step S11 (step S11).

If the oncoming vehicle 1B is detected on the narrower road that allows only one vehicle to pass therethrough, the control unit 100 causes the vehicle 1A to temporarily stay there and then to travel through the road after the oncoming vehicle 1B leaves the road. The autonomous traveling vehicle 1 that more efficiently avoids a collision with the oncoming vehicle than related art vehicles may thus be implemented.

Embodiment 3

An example of a travel control method of Embodiment 3 of the disclosure is described with reference to FIGS. 13A through 13C and FIGS. 14A through 14C. FIGS. 13A through 13C and FIGS. 14A through 14C illustrate the example of a determination method of a weight of the travel region TA of the autonomous traveling vehicle 1 in accordance with Embodiment 3 of the disclosure.

When the oncoming vehicle 1B is detected ahead of the vehicle 1A in the Embodiments 1 and 2, the travel region TA is weighted in accordance with only the positions of an obstacle, such as the oncoming vehicle 1B or the wall WL, without accounting for a relative difference between the travel speeds of the vehicle 1A and the oncoming vehicle 1B.

When the oncoming vehicle 1B is approaching the vehicle 1A at a higher speed, there is a higher possibility of collision of the vehicle 1A with the oncoming vehicle 1B if the vehicle 1A does not quickly turn.

In accordance with Embodiment 3, when the travel region TA is weighted, the travel speed of the oncoming vehicle 1B is accounted for.

Figure 13B:
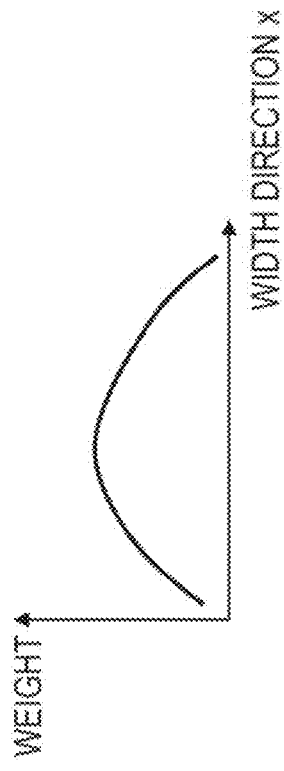
FIGS. 13A through 13C illustrate an example of a weight determination method of a traveling region for an autonomous traveling vehicle of Embodiment 3 of the disclosure.
Figure 13C:
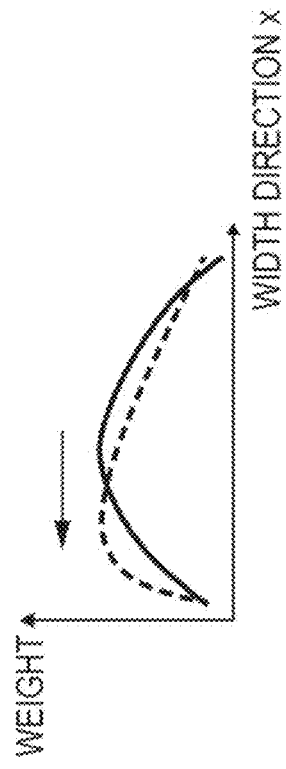
Figure 13A:
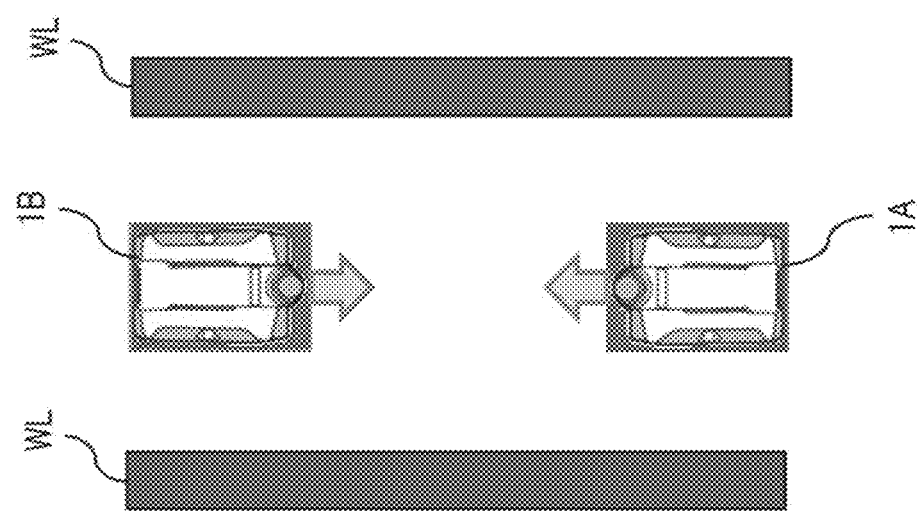

Referring to FIG. 13A, the travel speed of the oncoming vehicle 1B may now be lower. Before the oncoming vehicle 1B is approaching the vehicle 1A, the weight of the travel region TA has a left-right symmetrical hill having a wider width as illustrated in FIG. 13B. When the oncoming vehicle 1B is approaching the vehicle 1A, the peak of the hill shifts leftward in position as illustrated in FIG. 13C.

Figure 14B:
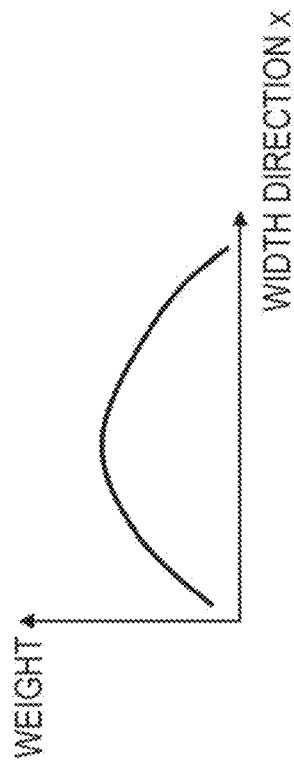
FIGS. 14A through 14C illustrate an example of the weight determination method of the traveling region for the autonomous traveling vehicle of Embodiment 3 of the disclosure.
Figure 14C:
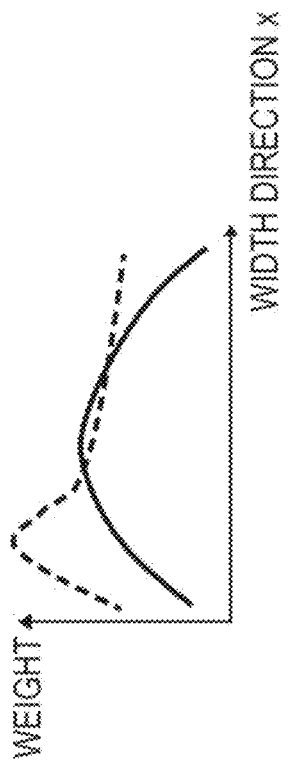
Figure 14A:
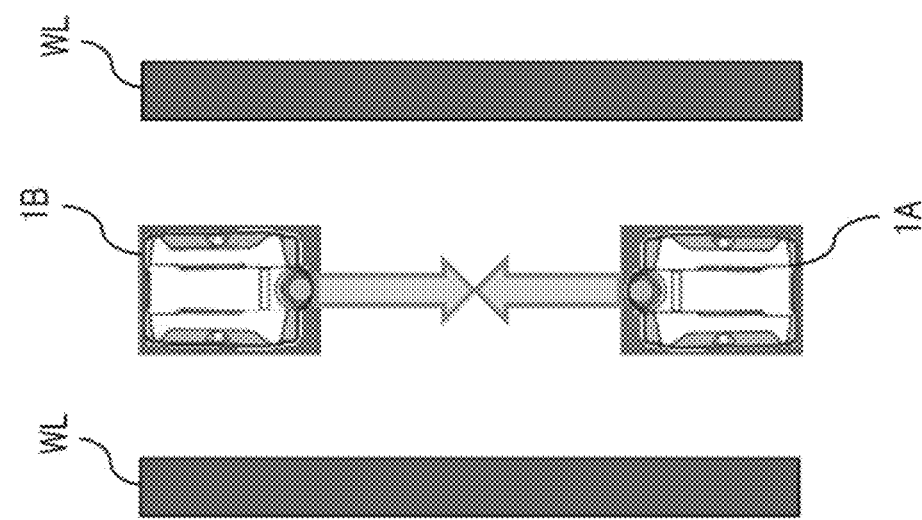

Referring to FIG. 14A, the travel speed of the oncoming vehicle 1B may be relatively higher. Before the oncoming vehicle 1B is approaching the vehicle 1A, the weight of the travel region TA has a left-right symmetrical hill having a wider width as illustrated in FIG. 14B. When the oncoming vehicle 1B is approaching the vehicle 1A, the peak of the hill shifts leftward in position as illustrated in FIG. 14C. However, the timing of the shifting is advanced more than the timing of the shifting in FIG. 13C. In this case, the width across the hill may be set to be narrower and a response speed in turning may be increased.

Accounting for the travel speed of the oncoming vehicle 1B in this manner, as the travel speed of the oncoming vehicle 1B is higher, the vehicle 1A is more quickly turned by increasing an amount of shift of the peak of the hill in position away from the center of the travel region TA. The autonomous traveling vehicle 1 that more efficiently avoids a collision with the oncoming vehicle than related art vehicles may thus be implemented.

Embodiment 4

Figure 15:
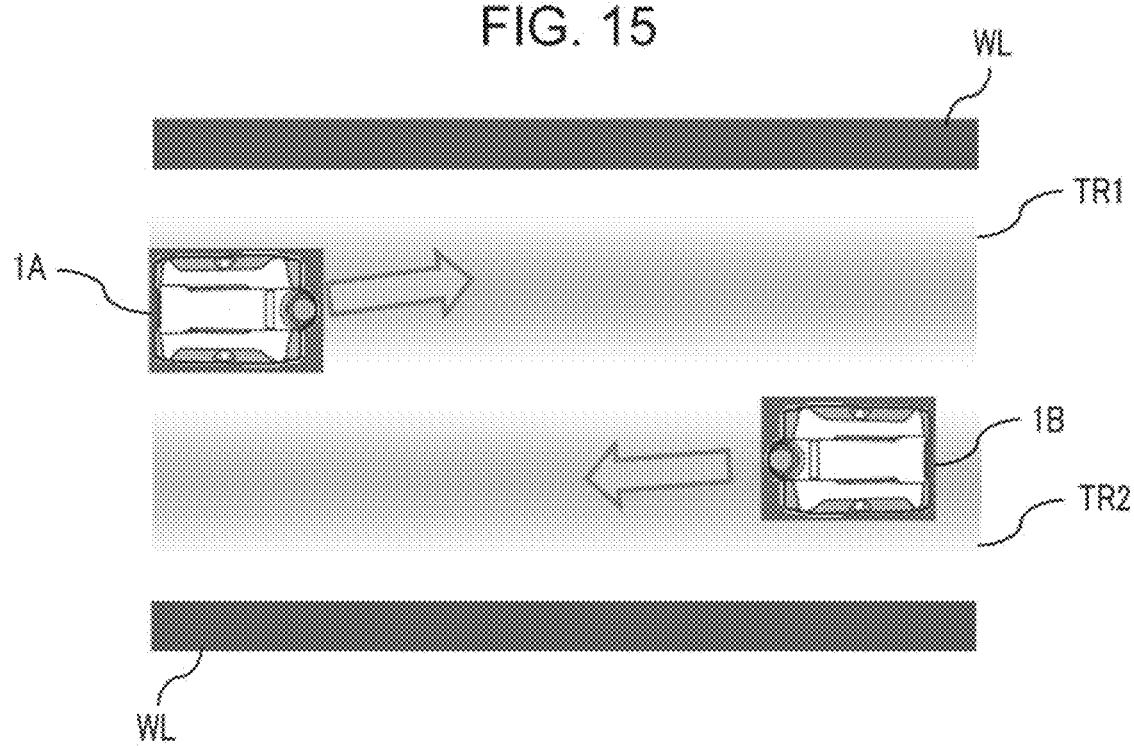
FIG. 15 illustrates an example of a weight setting of a traveling region for an autonomous traveling vehicle of Embodiment 4 of the disclosure.
Figure 16:
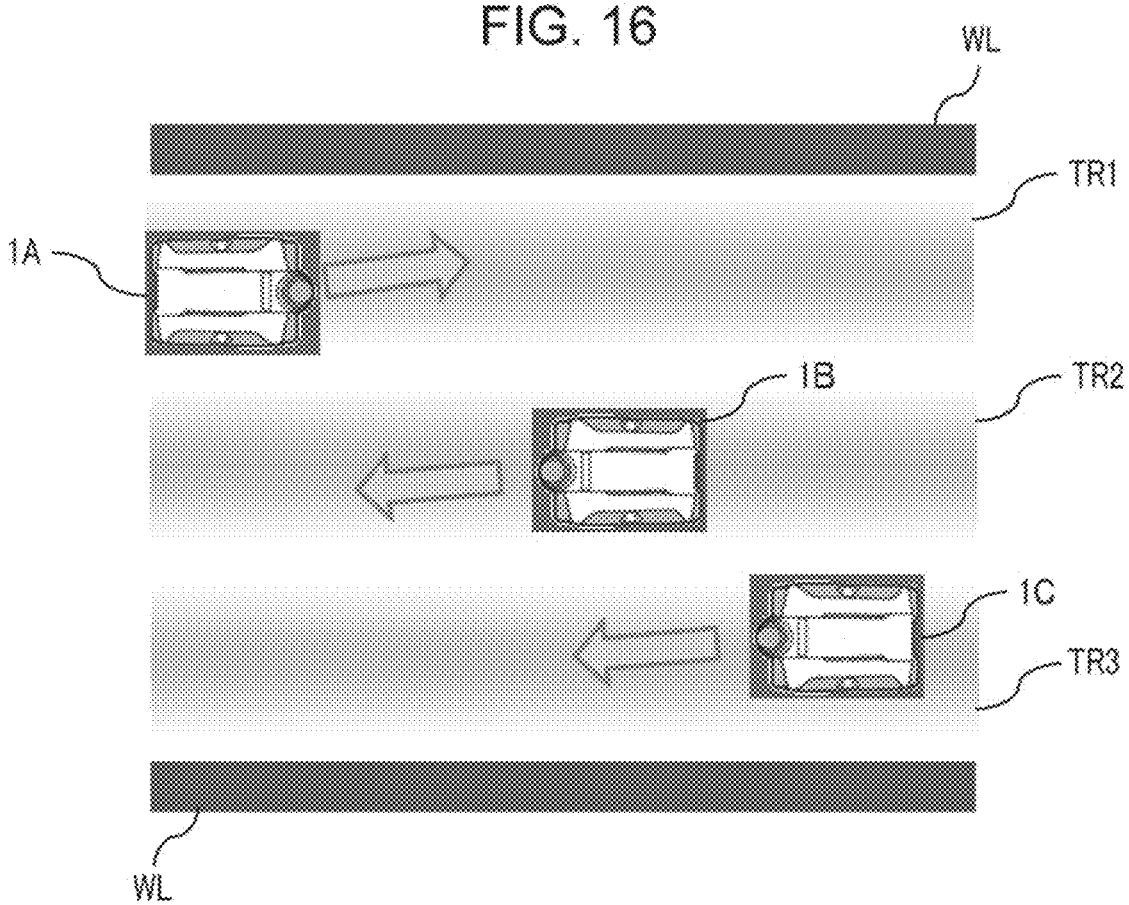
FIG. 16 illustrates an example of the weight setting of the traveling region for the autonomous traveling vehicle of Embodiment 4 of the disclosure.

An example of a travel control method of Embodiment 4 of the disclosure is described with reference to FIGS. 15 and 16. FIGS. 15 and 16 illustrate the example of a weight setting of the travel region TA of the autonomous traveling vehicle 1 in accordance with Embodiment 4 of the disclosure.

In accordance with Embodiments 1 to 3, the weighting to the predetermined side is performed when the obstacle is detected ahead. The vehicle that more efficiently avoids a collision with the oncoming vehicle than related art vehicles may thus be implemented by causing the vehicle to travel along the route having the higher weight.

However, if a weighting operation is performed on the whole travel region TA, an amount of computation involved becomes substantially larger. In accordance with Embodiment 4, the weighting of the travel region TA is set in advance such that vehicles travel along different traveling routes TR in a road wide enough to allow multiple evasive routes to be taken as illustrated in FIG. 15.

Referring to FIG. 15, the travel region TA is weighted such that the vehicle 1A and the oncoming vehicle 1B respectively travel along the keep-left traffic lanes, namely, routes TR1 and TR2.

Referring to FIG. 16, the travel region TA is weighted such that vehicles 1A through 1C respectively travel along three lanes, namely, routes TR1 through TR3.

Referring to FIGS. 15 and 16, each autonomous traveling vehicle 1 travels along the road. The weighting operation is not limited to an area of the road. The weighting operation may be performed for the travel region TA at any location in an area that is wide enough to allow multiple vehicles to pass by each other.

The travel region TA is thus weighted such that the vehicles travel along different traveling routes TR in a relatively wide road where each vehicle selects one route to be traveled from the multiple traveling routes TR. The autonomous traveling vehicle 1 that more efficiently avoids a collision with the oncoming vehicle than related art vehicles may thus be implemented in a manner free from a complex weighting operation.

Embodiment 5

Figure 17:
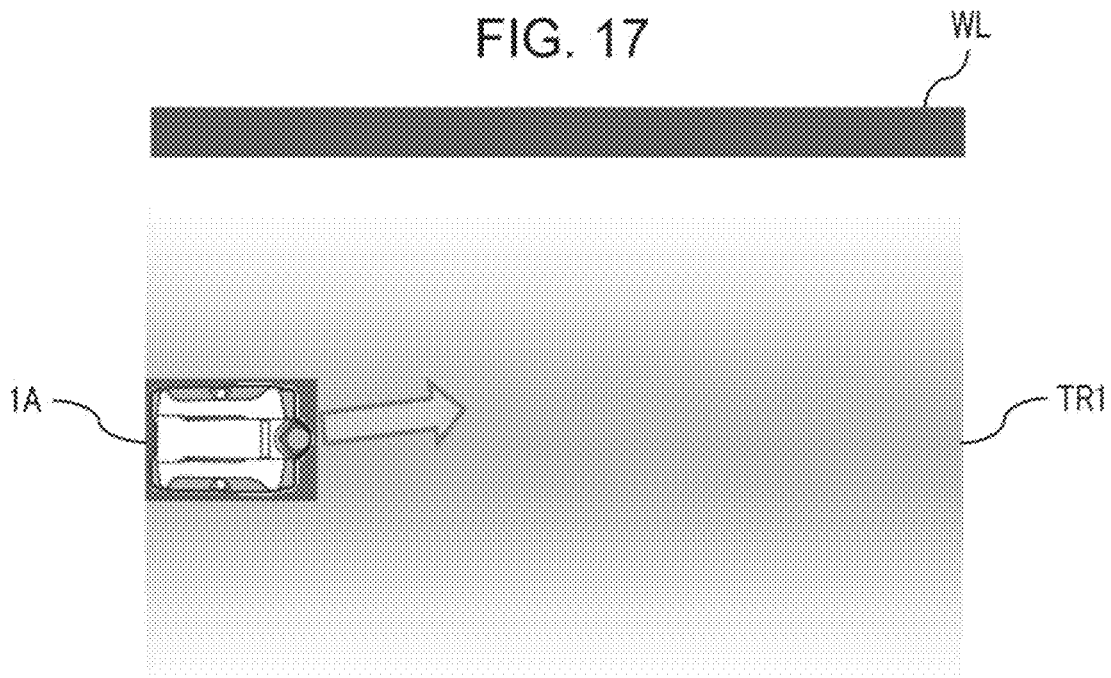
FIG. 17 illustrates an example of the weight setting of the traveling region for the autonomous traveling vehicle of Embodiment 4 of the disclosure.
Figure 18:
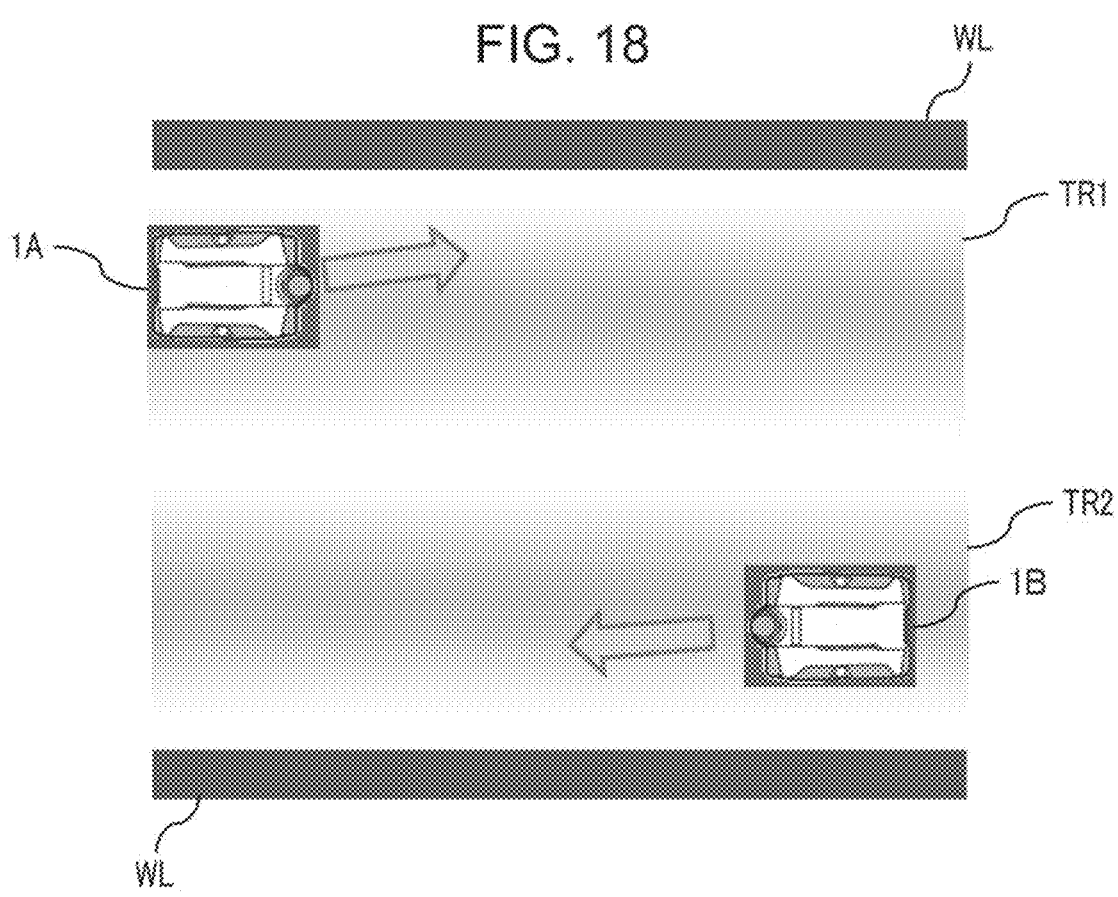
FIG. 18 illustrates an example of the weight setting of the traveling region for the autonomous traveling vehicle of Embodiment 4 of the disclosure.
Figure 19:
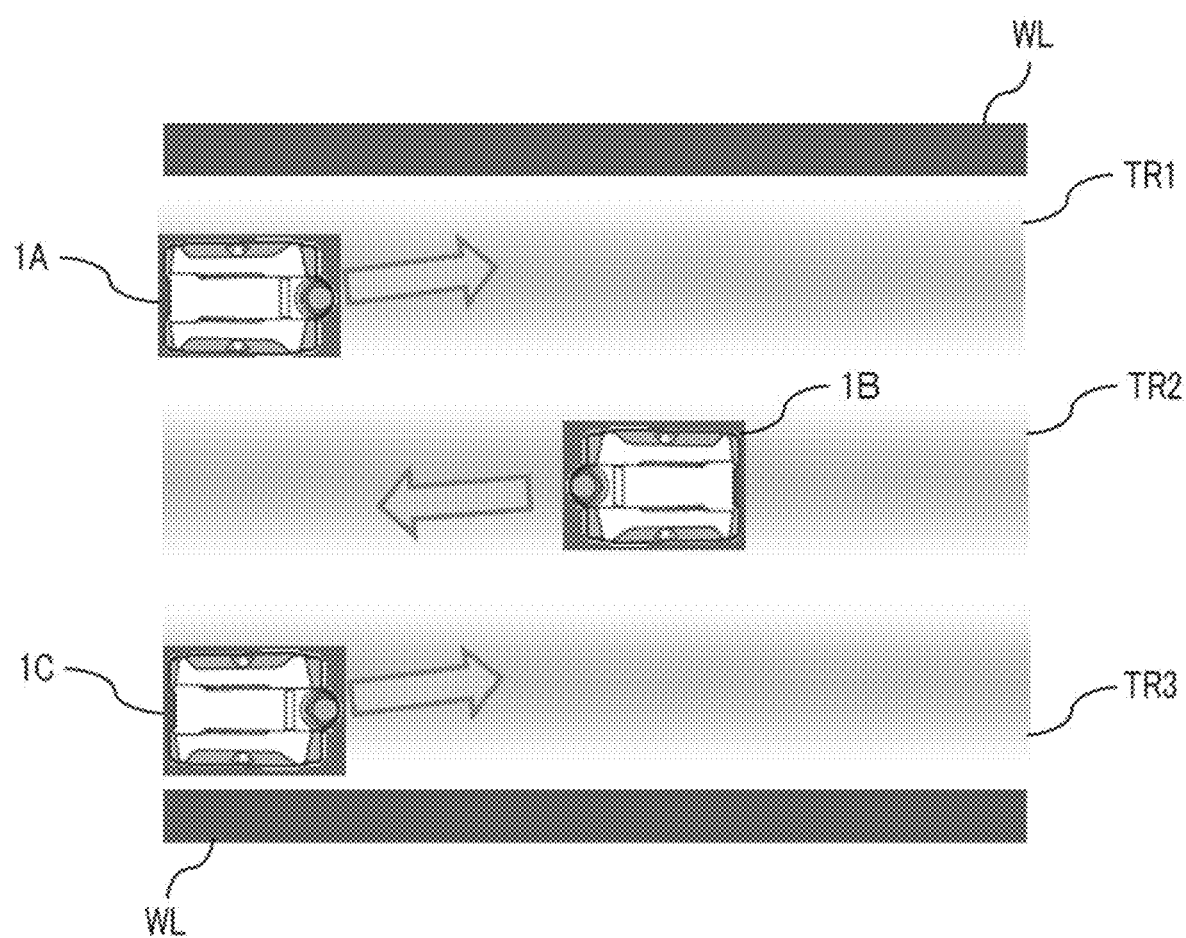
FIG. 19 illustrates an example of a weight setting of a traveling region for an autonomous traveling vehicle of Embodiment 5 of the disclosure.

Referring to FIGS. 17 through 19, an example of a travel control method of Embodiment 5 of the disclosure is described. FIGS. 17 through 19 illustrate an example of a weight setting of the travel region TA for the autonomous traveling vehicle 1 of Embodiment 5.

In accordance with Embodiment 4, the travel region TA is weighted in advance such that the vehicles travel along the different traveling routes TR. In accordance with Embodiment 5, the travel region TA is weighted in advance such that the vehicles travel along the different traveling routes TR in response to the number of oncoming vehicles.

Referring to FIG. 17, if no oncoming vehicles are present, the travel region TA is weighted such that the vehicle 1A travels along the traveling route TR1 with a higher priority.

Referring to FIG. 18, if an oncoming vehicle 1B is detected, the travel region TA is weighted such that the vehicles 1A and the vehicle 1B travel along the traveling routes TR1 and TR2, respectively.

Referring to FIG. 19, two vehicles 1B and 1C are detected, the travel region TA is weighted such that the vehicles 1A, 1B, and 1C travel along the traveling routes TR1, TR2, and TR3, respectively.

The travel region TA is weighted such that the vehicles travel along the different traveling routes TR in response to the number of oncoming vehicles in a relatively wide road where each vehicle selects one route to be traveled from the multiple traveling routes TR. The autonomous traveling vehicle 1 that more efficiently avoids a collision with the oncoming vehicle than related art vehicles may thus be implemented in a manner free from a complex weighting operation.

The present disclosure contains subject matter related to that disclosed in Japanese Priority Patent Application JP 2018-113574 filed in the Japan Patent Office on Jun. 14, 2018, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A traveling apparatus comprising:
   a housing;
   a traveling unit that causes the housing to travel in accordance with a traveling route,
   a memory that stores instructions; and
   a processor that executes the instructions stored in the memory to:
      detect a position of an obstacle in an area surrounding the housing;
      determine the traveling route of the housing in accordance with the position of the obstacle; and
   wherein, in accordance with the position of the obstacle in the area surrounding the housing, a distribution of weighting parameters for taking a course to a width direction of a path of the housing is set, and if the obstacle is detected on the path of the housing, the distribution of the weighting parameters is set such that a weighting parameter of an evasive course in a predetermined direction with respect to the obstacle increases.

2. The traveling apparatus according to claim 1, wherein a width across the distribution of the weighting parameters is set to be variable in response to a width of the path of the housing.

3. The traveling apparatus according to claim 1, wherein traveling of the housing is determined such that the housing takes a predetermined action in response to a width across the distribution of the weighting parameters.

4. The traveling apparatus according to claim 1, wherein the distribution of the weighting parameters is set such that a weighting parameter of an area closer to the obstacle is lower in magnitude than a weighting parameter of an area farther from the obstacle and sets the distribution of the weighting parameters such that a hill of the distribution is steeper as a traveling region to be traveled by the housing is narrower.

5. The traveling apparatus according to claim 1, wherein the distribution of the weighting parameters is set such that the weighting parameter of the evasive course in the predetermined direction with respect to the obstacle increases or the housing is caused to discontinue traveling, in response to a magnitude of a gradient of the distribution of the weighting parameters.

6. The traveling apparatus according to claim 1, wherein the processor further executes the instructions to detect a travel speed of the obstacle, and
   wherein if the obstacle is detected on the path of the housing, a traveling route for causing the housing to avoid the obstacle is determined at a predetermined timing in response to the travel speed of the obstacle.

7. The traveling apparatus according to claim 6, wherein an amount of a shift in a peak of a hill in position of the weighting parameters varies in response to the travel speed of the obstacle.

8. The traveling apparatus according to claim 6, wherein a timing of shifting, in position, a peak of a hill of the weighting parameters varies in response to the travel speed of the obstacle.

9. The traveling apparatus according to claim 1, wherein in a region wide enough for the housing to take a plurality of routes, the region is segmented into a plurality of predetermined courses, and
   wherein the distribution of the weighting parameters is set such that the housing takes only a predetermined course from among the courses.

10. A travel control method of a traveling apparatus, comprising:
    detecting a position of an obstacle in an area surrounding the traveling apparatus;
    determining a traveling route of the traveling apparatus in accordance with the position of the obstacle; and
    causing the traveling apparatus to travel in accordance with the traveling route,
    wherein in the determining, in accordance with the position of the obstacle in the area surrounding the traveling apparatus, a distribution of weighting parameters for taking a course to a width direction of a path of the traveling apparatus is set and if the obstacle on the path of the traveling apparatus is detected in the detecting, the distribution of the weighting parameters is set such that a weighting parameter of an evasive course in a predetermined direction with respect to the obstacle increases.

11. A non-transitory computer readable medium storing a program causing a processor of a traveling apparatus to execute a process, the process comprising:
    detecting a position of an obstacle in an area surrounding a traveling apparatus;
    determining a traveling route of the traveling apparatus in accordance with the position of the obstacle; and
    causing the traveling apparatus to travel in accordance with the traveling route,
    wherein in the determining, in accordance with the position of the obstacle in the area surrounding the traveling apparatus, a distribution of weighting parameters for taking a course to a width direction of a path of the traveling apparatus is set and if the obstacle on the path of the traveling apparatus is detected in the detecting, the distribution of the weighting parameters is set such that a weighting parameter of an evasive course in a predetermined direction with respect to the obstacle increases.

* * * * *